(12) United States Patent
Scianna (10) Patent No.: US 7,872,427 B2
(45) Date of Patent: Jan. 18, 2011

(54) DIMMING CIRCUIT FOR LED LIGHTING DEVICE WITH MEANS FOR HOLDING TRIAC IN CONDUCTION

(75) Inventor: Carlo Scianna, Des Plaines, IL (US)

(73) Assignee: Goeken Group Corp., Naperville, IL (US)

( * ) Notice: Subject to any disclaimer, the term of this patent is extended or adjusted under 35 U.S.C. 154(b) by 302 days.

(21) Appl. No.: 11/576,671

(22) PCT Filed: May 19, 2005

(86) PCT No.: PCT/US2005/017551

§ 371 (c)(1),
(2), (4) Date: Jun. 19, 2008

(87) PCT Pub. No.: WO2005/115058

PCT Pub. Date: Dec. 1, 2005

(65) Prior Publication Data

US 2008/0258647 A1 Oct. 23, 2008

Related U.S. Application Data (60) Provisional application No. 60/572,557, filed on May 19, 2004.

(51) Int. Cl.
*G05F 1/00* (2006.01)
*H05B 41/16* (2006.01)
(52) U.S. Cl. ...................................... 315/291; 315/246
(58) Field of Classification Search .................. 315/291, 315/307, 224, 194, 246
See application file for complete search history.

(56) References Cited

U.S. PATENT DOCUMENTS 5,350,977 A * 9/1994 Hamamoto et al. .......... 315/291
6,088,249 A * 7/2000 Adamson ..................... 363/97

(Continued)

FOREIGN PATENT DOCUMENTS

WO 99/45750 9/1999

(Continued)

OTHER PUBLICATIONS

International Search Report issued in application No. PCT/US2005/017551 (2005).

*Primary Examiner*—Douglas W Owens
*Assistant Examiner*—Minh D A
(74) *Attorney, Agent, or Firm*—Barnes & Thornburg LLP (57) ABSTRACT

The invention disclosed herein is a dynamic dummy load to allow a phase control dimmer to be used with LED lighting. The invention includes providing a dynamic dummy load to provide a load to the dimmer when the LED electronics do not provide sufficient load due to start up issues or ringing in the circuit, the dynamic dummy load providing a reduced flow of current when the LED and its converter electronics provide sufficient current draw from the dimmer. The system generally includes a power source electrically connected to a phase control dimmer, the phase control dimmer electrically connected to converter circuitry to convert the AC power output of the dimmer to DC power output for powering the LED lighting, a dynamic dummy load electrically connected in parallel with the converter circuitry, the dummy load varying its current draw in response to operation of the converter circuitry.

15 Claims, 6 Drawing Sheets

U.S. PATENT DOCUMENTS

| | | | |
|---|---|---|---|
| 6,175,195 B1 * | 1/2001 | Janczak et al. | 315/194 |
| 6,727,661 B2 * | 4/2004 | Kominami et al. | 315/209 R |
| 6,906,476 B1 * | 6/2005 | Beatenbough et al. | 315/276 |
| 6,998,792 B2 * | 2/2006 | Takahashi et al. | 315/248 |
| 7,038,399 B2 * | 5/2006 | Lys et al. | 315/291 |
| 2001/0000423 A1 * | 4/2001 | Fischer et al. | 320/114 |
| 2004/0085030 A1 | 5/2004 | LaFlamme et al. | |

FOREIGN PATENT DOCUMENTS

| | | |
|---|---|---|
| WO | 01/01385 | 1/2001 |
| WO | 03/096761 | 11/2003 |

* cited by examiner

Time/mSecs

DIMMING CIRCUIT FOR LED LIGHTING DEVICE WITH MEANS FOR HOLDING TRIAC IN CONDUCTION

RELATED APPLICATIONS

This application claims priority to U.S. provisional application 60/572,557 filed on May 19, 2004, which is herein incorporated by reference.

FIELD OF THE INVENTION

This invention is in the field of LED lighting, particularly circuitry to allow low electrical current LED lighting to work with dimming switches.

BACKGROUND OF THE INVENTION

This invention is related to making the AC to DC converter used on LED lighting compatible with the phase control dimmer which is widely used for incandescent wall dimming applications. A typical circuit for use of a dimmer is shown in FIG. 1.

Figure 1:
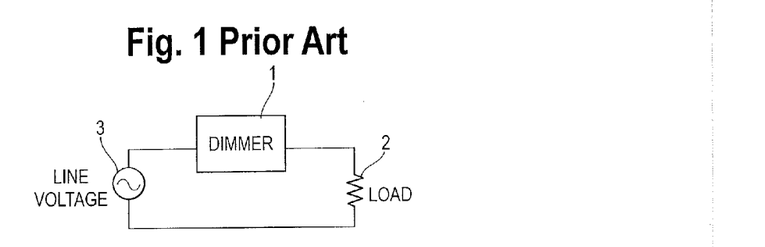
FIG. 1 is a basic electrical circuit showing a phase control dimmer electrically connected in series between a power source and a load.

As shown in FIG. 1, the dimmer 1 is electrically connected in series between the electrical load 2, and the power source 3. In this example, the power source is AC household current as one would find in a typical household dimming application. The load 2 in the example is an incandescent light bulb, but one skilled in the art will recognize other loads may be used. Dimming is achieved by adjusting the conduction angle of the dimmer 1 so that the RMS voltage across the load 2 varies with the adjustment of the conduction angle. In the case of the incandescent bulb being the load 2, the light intensity of the light bulb will change as the RMS voltage is varied across the light bulb. A reduced RMS voltage across the light bulb results in a dimmer light bulb.

Figure 2:
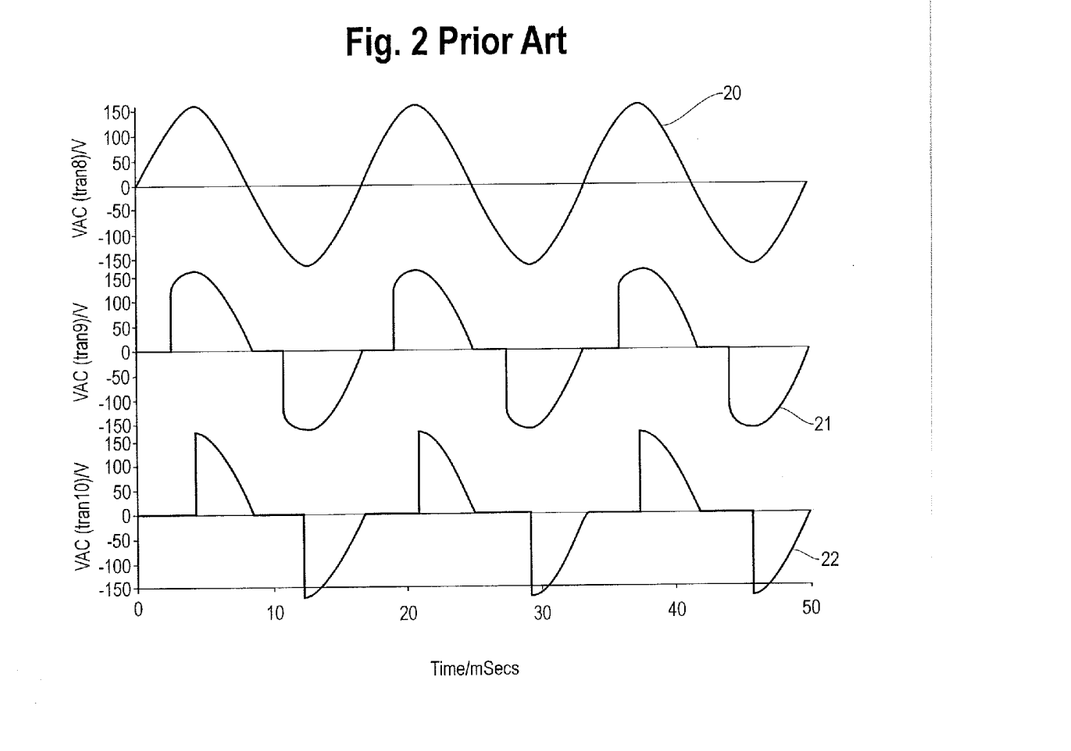
FIG. 2 is a plot showing a household AC wave form, and waveforms resulting from applying a phase control dimmer to the household AC power supply.

As shown in FIG. 2, the dimmer can create different waveforms across the load, depending upon the conduction angle adjustment of the dimmer. The first example 20 shown in FIG. 2 shows the waveform of a 115 volt 60 hertz domestic AC power supply without a dimmer. The second 21 and third 22 examples in FIG. 2 show the output waveforms generated when the 115 volt 60 hertz domestic AC power line is adjusted by a phase control dimmer. In summary, the dimmer clips the waveform for a certain period after a zero crossing, thus resulting in a reduced RMS voltage at the output. One skilled in the art will recognize that the dimmer may clip the waveform at different times and by different amounts than what is shown in FIG. 2.

Although there is a wide variety of circuit techniques that can achieve the dimming function, the switch or circuit element that controls the power on-off inside a typical phase control dimmer is typically a type of thyristor device commonly known in the art as a TRIAC. TRIACs are generally available from a number of sources, and have well understood characteristics. Example TRIACs are models MAC12V, MAC12M and MAC12N, available from On Semiconductor, which may be found at the home page http://onsemi.com. The TRIACs discussed herein are generally representative of the TRIACs that are available, but are in no way meant to limit the scope of the invention described herein. TRIACs generally have a first main terminal MT1 a second main terminal MT2 and a gate terminal G. As known to one skilled in the art, TRIACs generally exhibit the following basic characteristics:

Bidirectional conduction through the main terminals, allowing AC to pass through.

The TRIAC is turned on and conduction is present between the main terminals when there is a trigger current present between gate G and second main terminal 2 MT2.

Once triggered, the TRIAC remains on until a zero crossing of the AC power line at which point the device turns off and awaits the next trigger pulse or zero crossing of the AC power line. This characteristic allows phase angle control to be achieved.

The TRIAC has one more important parameter that directly relates to LED lighting, that is the hold current. A TRIAC will not remain in the on state after triggering without a current larger than the hold current passing through the main terminals. Because of the need to hold a current, TRIACs have difficulty remaining on when a low current is drawn through the main terminals, such as in the case of LED lighting. With reference to the data sheet for TRIAC MAC12D, the hold current is typically 20 milliamps.

There a number of reasons that dimmers cause problems for LED lighting, especially low wattage LED lighting. Some of these reasons are set forth below.

1. LED lighting is more energy efficient that incandescent light, therefore drawing a much smaller current. A typical incandescent light bulb can easily draw more than 200 mA during conduction. This value largely exceeds the holding current of typical dimmers. Therefore, there is usually no problem in dimming an incandescent bulb. LED lighting generally draws less current, typically ranging from 10 to 150 mA depending on the circuit design.

At smaller current levels, once the dimmer conducts, the load current does not satisfy the hold current requirement of the device, namely the TRIAC in the dimmer, and the dimmer enters a retriggering state that causes flickering of the LED light. The problem may be solved by placing a dummy load in parallel across the LED lighting so as to provide a sufficient current draw to exceed the hold current of the TRIAC in the dimmer. However, this is not a desired option. Since LED lighting is meant to be energy efficient, putting a dummy load across the LED lighting device will cause some issues such as reduced energy efficiency, due to the power draw of the dummy load, and degeneration of heat inside LED lighting which is undesirable to the thermal management of the power electronics inside.

Figure 3:
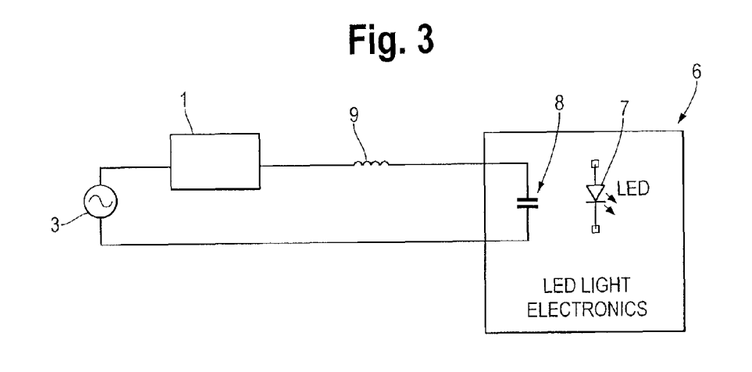
FIG. 3 is a representative circuit showing a dimmer used with LED lighting and converter electronics.
Figure 4:
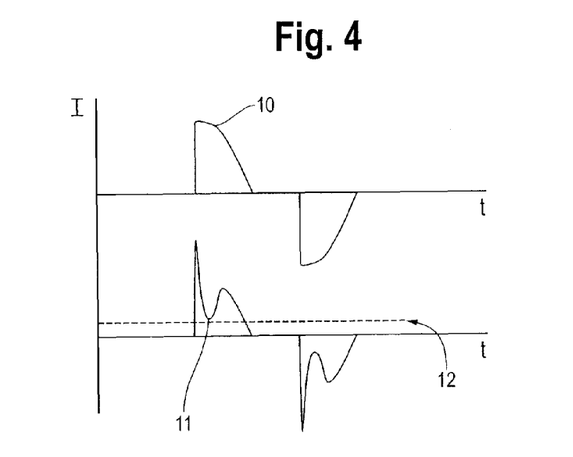
FIG. 4 is a plot showing the current output of a dimmer, and a waveform for an output exhibiting ringing.

2. Dimmable LED lighting requires an electronic AC to DC converter to operate. The AC to DC converter is basically a step-down switch mode power supply that converts AC input voltage to low voltage high current that drives the LED emitters. A representative circuit is shown in FIG. 3. As with the circuit in FIG. 1, it includes a power source 3, a dimmer 1 and a load all connected in series. The load in the representative circuit is LED lighting electronics 6 to convert the AC to DC and the LED 7. The Figure also shows the small amount of inductance 9 that is present due to the character of the wire. Inside the converter electronics there is small amount of capacitance 8 that will cause the load current to ring when the dimmer starts conduction. FIG. 4 shows the output current waveform 10 of a dimmer, and the dimmer output waveform 11 when ringing is present at the firing or starting of the dimmer. If the ringing is large enough to cause current flow to fall below the hold current threshold 12 of the TRIAC, dimmer conduction will cease, causing flickering of the LED light.

3. The control circuit inside the dimmer requires a small bias current as its power supply to power up the dimmer. This implies the LED lighting load presented to the dimmer has to provide such minimum current. However, the electronic converter inside the LED converter usually has very low current consumption. This prevents the dimmer circuit from firing properly, again causing ringing.

4. The LED converter takes time to start, therefore its current consumption requires a finite time to reach a level exceeding the hold current of the dimmer. This delay in providing sufficient current needs to be taken into account in any circuitry.

In view of these shortcomings, it is desirable to include a dynamic load for use with a phase control dimmer and LED lighting, the dynamic load providing sufficient load to the dimmer at appropriate times to provide sufficient hold current, and prevent ringing in the circuit.

SUMMARY OF THE INVENTION

The invention described herein is a dynamic load or snubbing circuit for use with a phase control dimmer and LED lighting. The dynamic load provides sufficient current draw for the dimmer circuit and provides a current draw that will be varied depending on the current draw needs of the dimmer.

DETAILED DESCRIPTION OF THE PREFERRED EMBODIMENT

Figure 5:
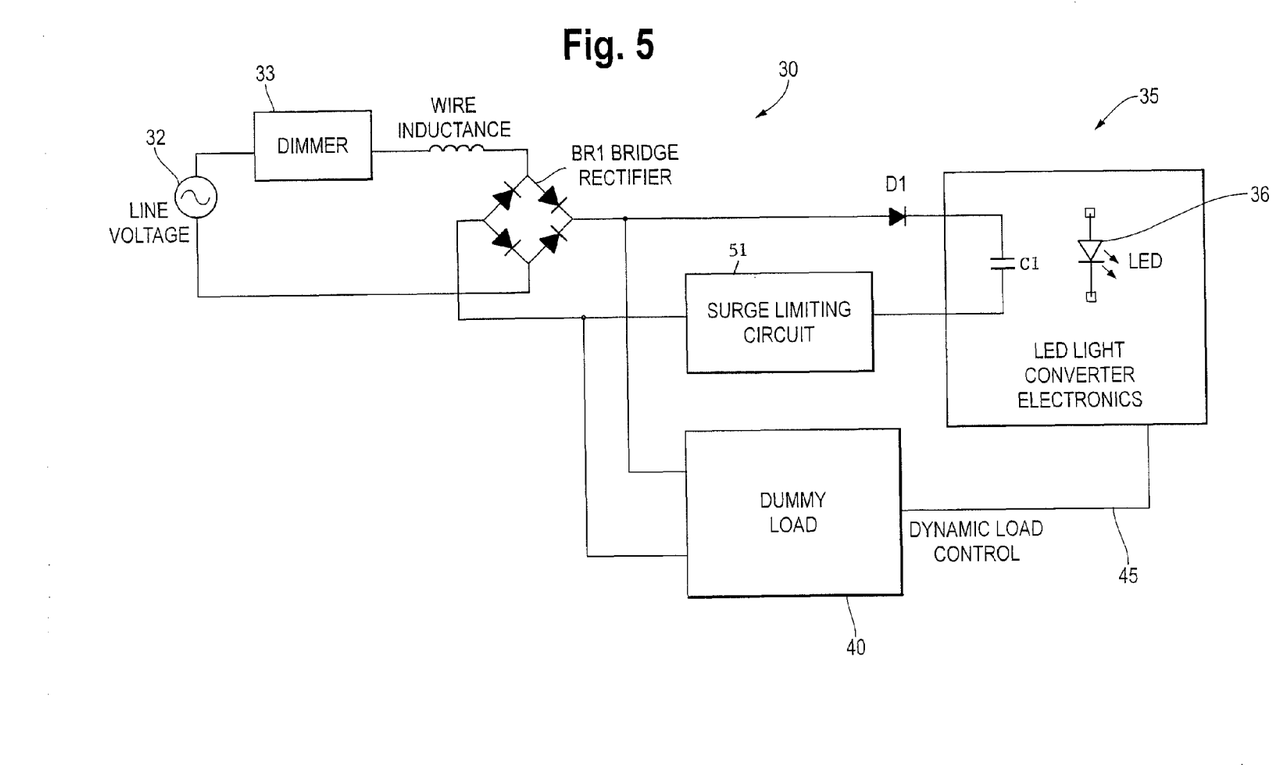
FIG. 5 is a block representation of a dimmable LED lighting circuit, including a dynamic snubbing element.

As shown in FIG. 5, the dynamic dummy load circuit 30 of the present invention is connected to an AC power source 32 electrically connected to a dimmer 33 which is electrically connected to a bridge rectifier BR1. The LED lighting converter 35 having a LED 36 is connected in parallel across the bridge rectifier BR1. The dynamic dummy load 40 is placed in parallel with the LED light converter 35. A feedback channel 45 is provided between the LED light converter 35 and the dummy load 40, so that the dummy load may be adjusted to provide an appropriate load when needed and a reduced load when not needed, thereby conserving power. The lighting converter 35 includes electronics to regulate the power received from the bridge rectifier BR1 and includes electronics to provide a control or feedback signal to the dynamic dummy load 40. The load presented to the power source or bridge rectifier BR1 by the dynamic dummy load 40 is varied based on the control signal, thus changing the amount of current that flows or is drawn by the dynamic dummy load 40.

Figure 6:
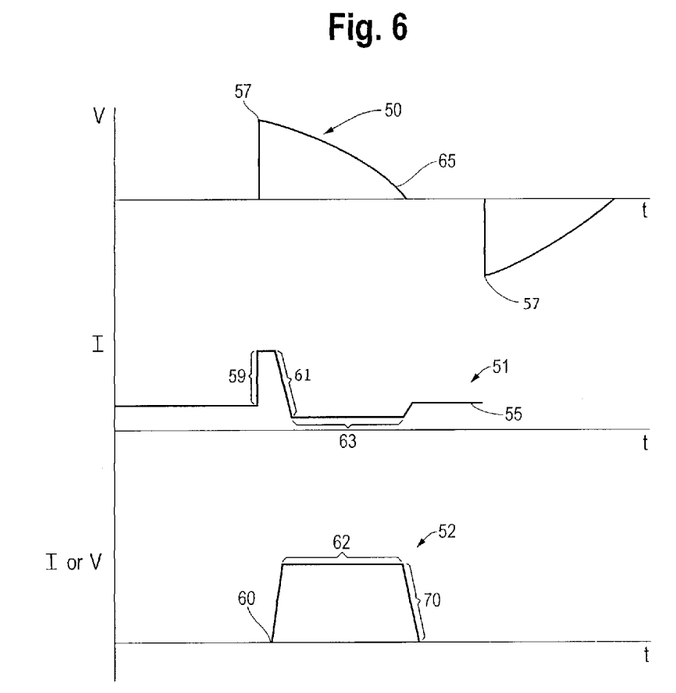
FIG. 6 is a plot showing the relationship between the dimmer voltage output, dummy load current, and control signal with respect to time.

FIG. 6 shows three plots representing the voltage output 50 of the dimmer 40, the current 51 through the dummy load, and the feedback or control signal 52 from the LED lighting electronics 35 to the dummy load 40, all with respect to time. One skilled in the art will recognize that the control signal 52 could be a voltage or current signal. For example, with reference to the plots shown in FIG. 6, the dummy load provides adequate bias current 55 for the dimmer circuit prior to operation, as discussed in the background section of this application. Thus, the dummy load will not have a high power consumption prior to dimmer conduction, as the power consumption is being limited by the low flow of current through the dimmer circuit when the dimmer is off. However, if the dummy load 40 were not present, there would be no conduction, as the LED would not conduct at the bias current level.

Figure 8:
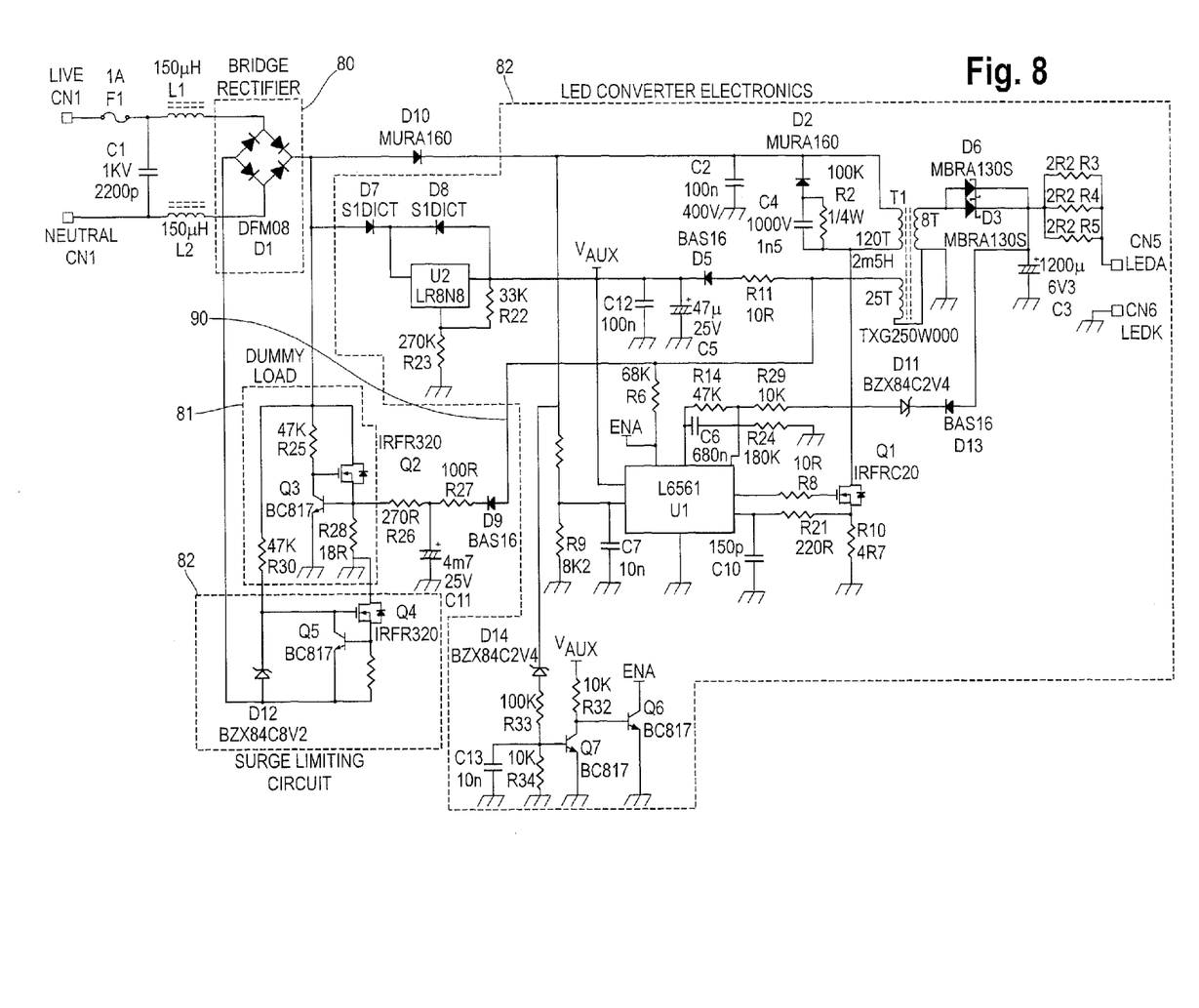
FIG. 8 is a schematic showing an alternate embodiment of the invention, including a surge limiting circuit.

When the dimmer fires 57, the dynamic dummy load 40 provides additional current 59 consumption that when combined with the current consumption of the LED converter 35, provides sufficient current drawn through the dimmer 33 to exceed the hold current of the dimmer 33. The current provided through the dynamic dummy load 40 will stay at a sufficiently high value, until the LED converter 35 starts and its current consumption exceeds the hold current of the dimmer. At this point in time 60 a feedback signal 52 is sent via feedback channel 45 to the dynamic dummy load 40, thereby reducing the current draw 60 of the dynamic dummy load. A typical profile is shown in FIG. 8. So long as the feedback signal 52 is maintained 62 at a sufficient level, the dummy load 40 current draw is maintained at a low level 63. Preferably below the bias current level 55. When the dimmer 33 output reaches the zero crossing 65, the control signal 52 is reduced 70, allowing the dummy load 40 to pass bias level current 55. When the dimmer 40 fires again 72, the process is repeated.

In an optional embodiment, a surge limiting circuit 50, shown in FIG. 5, may be included in series between the bridge rectifier BR1 and the LED lighting converter 35. The surge limiting circuit 50 limits the current peak when the dimmer fires, and leads to reduction of the ringing current magnitude. This reduces the need for a higher dummy load current. An example of a surge limiting circuit can be a constant current source.

Also shown in FIG. 5, diode D1 connected between the rectifier DC output of the input rectifier circuit and the bypass capacitor. This diode stops the current from reversing from the bypass capacitor C1 of the LED lighting converter 35. Diode D1 stops the current from reversing from the bypass capacitor C1 of the LED lighting converter 35 into the input bridge rectifier and thus significantly reduces the ringing magnitude. Preferably, diode D1 belongs to the type that exhibit low junction capacitants when reversed biased, thus greatly reducing the equivalent capacitants seen into the LED lighting converter 35 when there is a tendency for the current to reverse.

Figure 7:
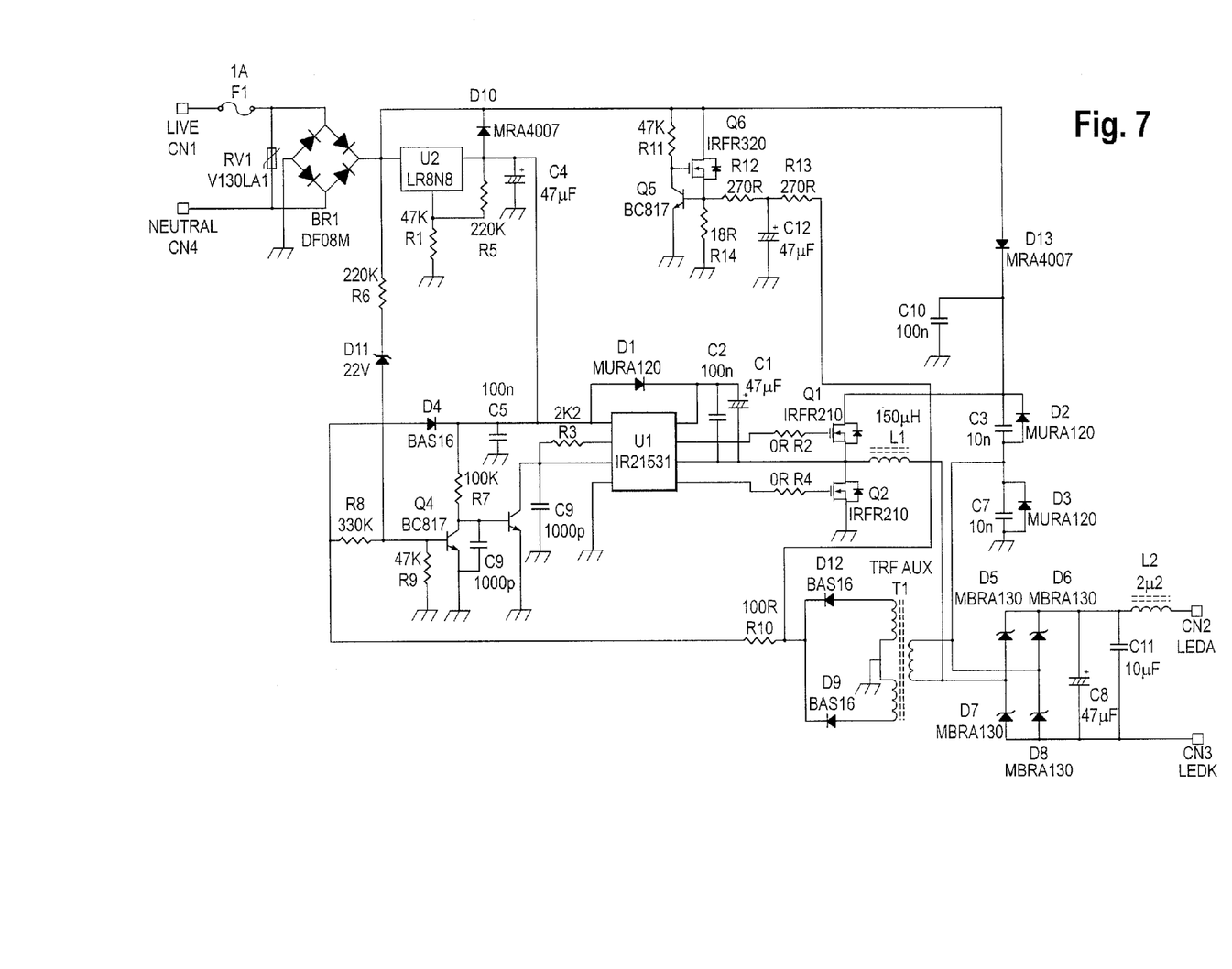
FIG. 7 is a schematic showing a preferred implementation of the invention.

A schematic showing an embodiment of a circuit utilizing the dynamic dummy load of the invention is shown in FIG. 7. the dimmer is not shown in the figure, but ne skilled in the art would recognize the dimmer would be provided between terminals CN1 and CN4. Similarly, the LED is not shown, but would be provided between terminals CN2 and CN3.

With reference to FIG. 7, the dynamic dummy load is a current source including MOSFET Q6 and transistor Q5. Dynamic dummy load current modulation is introduced from the auxiliary power supply of the LED converter from the junction of diodes D12 and D9. A brief time delay is generated by the time constant of resistor R13 and capacitor C12.

Before the LED converter starts, no current is flowing into resistor R13, and the dummy load current source including MOSFET Q6 and transistor Q5 is sinking its maximum current. When the dimmer, not shown, fires, the LED converter starts operating, and a voltage equal to a derivative of the LED voltage, as defined by the currents ratio of transformer T1, is generated at the cathode junction of diodes D9 and D12. This voltage supplies the control ICU1 as well as injecting a current determined by the derived auxiliary voltage and resister values of resisters R12 and R13. Since the action of the dummy load current source is to maintain a predetermined voltage drop across a resister R14, injecting current from another source other than MOSFET Q6 will reduce the current flowing MOSFET Q6, and thereby current is reduced when a converter starts.

A brief delay introduced by resister R13 and capacitor C12 insures that current does not fall immediately as the LED converter starts, thus reducing any ringing current magnitude.

Diode D13 stops current from reversing from the LED converter electronics into the bridge rectifier BR1 thus reducing any ringing current magnitude.

FIG. 8 shows an alternate embodiment of the invention described herein. The dimmer is not shown in the figure, but would be connected in series with a power source to terminals CN1 and CN4. The circuit includes a bridge rectifier 80 connected to the output of the dimmer to convert AC current to DC current. Bridge rectifier 80 then provides current to the dummy load 81 and the LED converter electronics 82. The dummy load 81 is electrically connected to a surge limiting circuit 82 which functions to limit the maximum current through the circuit. The schematic does not show the LED, which if present would be connected between terminals CN5 and CN6 of the LED converter electronics 82. A feedback channel 90 is provided between the LED converter electronics and the dynamic dummy load 81.

Although one skilled in the art would understand the functions of the various devices used to form the circuit elements described above, a brief description of major elements is included to aid in understanding of the circuit elements. The LED lighting converter electronics 82 includes an adjustable voltage regulator U2 along with its associated diodes D7 and D8 and resistors R22 and R23 to provide a regulated DC current to converter ICU1. In turn, ICU1 functions as a regulator of current provided to LED terminals CN5 and C6. Converter ICU1 also includes an output connected to MOSFET Q1, which acts as a main switch, controlled by converter ICU1.

Transformer T1 is preferably a high frequency transformer provided to step down the voltage input into the transformer to a lower voltage for powering the LED connected between terminals CN5 and CN6. The transformer T1 also provides a feedback signal to the dynamic dummy load 81 via the feedback channel 90, which in the present implementation includes diodes D9 and resistor R27. The output of the transformer T1 is electrically connected to power rectifiers D6 and D3 which rectifies the high frequency AC output to direct current to be provided to the LED at terminals CN5 and CN6. Since the rectified DC output provided by rectifiers D6 and D3 will be pulsing, capacitor C3 is electrically connected between the rectifier output and ground to filter and smooth the output from rectifiers D6 and D3.

Circuit elements diode D5 and capacitor C5 are connected to another output of transformer T1, and provide an auxiliary power supply to converter ICU1, thereby reducing the power dissipation of linear regulator U2.

Capacitor C4, and resistors R2 and diode D2 act to suppress high voltage spikes across main switch MOSFET Q1.

Dummy load 81 includes a two transistor current source, wherein the current through MOSFET Q2 is regulated by a quantity determined by resistor R28 and the base to emitter voltage drop of transistor Q3.

The surge limiting circuit is electrically connected to the dynamic dummy load 81 and the bridge rectifier 80. The surge limiter includes a two transistor current source formed by MOSFET Q4 and transistor Q5. The surge limiter limits the maximum current allowed through the LED converter electronics. The surge limiting circuit includes zener diode D12 which functions to limit the voltage across the gate and source of MOSFET Q4 is maintained at a safe level.

The embodiments disclosed herein are merely examples of implementations of the invention claimed, and are not meant to limit the scope of the invention. One skilled in the art will recognize that other implementation will achieve the claimed invention.

The invention claimed is:

1. An electric circuit including a triac to control power on-off in a dimmer, the dimmer being electrically connected in series between a power supply and an LED lighting device, further including a dynamic dummy load placed in parallel with the LED lighting device, the dynamic load receiving a control signal from the LED lighting device, the dynamic dummy load adjusting the load in response to the signal by drawing a high triac holding current when the LED lighting device does not draw sufficient current through the triac to maintain the triac in conduction, and a low triac holding current when the triac is in conduction, wherein the dynamic dummy load includes a Mosfet, transistor, resistors and capacitor connected in series.

2. The electric circuit of claim 1, further including a surge limiting element in series with the power source and the LED lighting device.

3. The electric circuit of claim 2 wherein the surge limiting element is a constant current source.

4. The electric circuit of claim 1, wherein the control signal is a current signal.

5. The electric circuit of claim 1, wherein the LED lighting device includes an AC to DC converter.

6. The electric circuit of claim 1, wherein the dimmer exhibits a bias current, the dynamic dummy load providing a load for the bias current prior to firing of the dimmer.

7. The electric circuit of claim 6, wherein the dynamic dummy load exhibits increased current flow upon firing of the dimmer.

8. A method of using a phase control dimmer with an LED to dim the LED, including the steps of:
   providing the phase control dimmer including a triac to control power on-off in the dimmer, the dimmer being connected to a power supply;
   providing an LED electrically connected in series with the dimmer;
   providing a dynamic dummy load in parallel with the LED,
   varying the dynamic dummy load to draw a high triac holding current from the dimmer in excess of a hold current of the dimmer upon firing of the dimmer, and thereafter varying the load to draw a low triac holding current as the current drawn by the LED exceeds the hold current, wherein the dynamic dummy load includes a Mosfet, transistor, resistors and capacitor.

9. The method of claim 8, further including the steps of providing a control signal to the dynamic dummy load.

10. A dimmable LED lighting system including:
   a power source electrically connected to a phase control dimmer including a triac to control power on-off in the dimmer, the phase control dimmer electrically connected to converter circuitry to convert AC power output of the dimmer to DC power output for powering an LED lighting device, a dynamic dummy load electrically connected in parallel with the converter circuitry, the dummy load varying its current draw in response to operation of the converter circuitry by holding a high triac holding current when the LED lighting device does not draw sufficient current through the triac to maintain the triac in conduction, and a low triac holding current when the triac is in conduction, wherein the dynamic dummy load includes a Mosfet, transistor, resistors and capacitor connected in series.

11. The system of claim 10, further including a control channel form the converter circuitry to the dynamic dummy load, the control channel carrying a control signal generated by the converter circuitry in response to the current provided to the LED lighting device.

12. The system of claim 10, further including a bridge rectifier electrically connected between the dimmer and the converter circuitry.

13. The system of claim 10 wherein the converter circuitry includes a transformer to reduce the voltage provided from the dimmer.

14. The system of claim 13, wherein the transformer also generates the control signal.

15. The system of claim 10, further including a surge limiting circuit electrically connected to the dynamic dummy load.

* * * * *